(12) United States Patent
Verbrugge

(10) Patent No.: US 6,793,192 B2
(45) Date of Patent: Sep. 21, 2004

(54) PROCESS OF MAKING INTEGRAL THREE-DIMENSIONAL ARTICLES, AND MOLD FOR MAKING SUCH ARTICLES

(75) Inventor: Theodore Jay Verbrugge, Reily, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 137 days.

(21) Appl. No.: 10/090,601

(22) Filed: Mar. 4, 2002

(65) Prior Publication Data

US 2003/0164439 A1 Sep. 4, 2003

(51) Int. Cl.⁷ .............................................. B29C 33/42
(52) U.S. Cl. ........................ 249/64; 249/63; 249/122; 249/175; 249/184; 264/318
(58) Field of Search ........................ 249/184, 63, 64, 249/122, 175, 176; 264/318

(56) References Cited

U.S. PATENT DOCUMENTS

| | | | | |
|---|---|---|---|---|
| 2,133,019 A | * | 10/1938 | Campbell | 249/59 |
| 2,369,067 A | * | 2/1945 | Mayer | 164/354 |
| 2,615,202 A | * | 10/1952 | Talalay | 428/159 |
| 2,923,975 A | * | 2/1960 | Voumard et al. | 425/393 |
| 3,904,165 A | * | 9/1975 | Den Boer | 249/67 |
| 4,062,524 A | | 12/1977 | Brauner et al. | |
| 4,218,038 A | | 8/1980 | Garneau, Sr. | |
| 4,220,416 A | | 9/1980 | Brauner et al. | |
| 4,471,936 A | * | 9/1984 | Bondpers | 249/152 |
| 5,378,063 A | | 1/1995 | Tsukada | |
| 5,435,061 A | | 7/1995 | Lantz | |
| 5,522,661 A | | 6/1996 | Tsukada | |
| 5,891,487 A | | 4/1999 | Parise | |
| 6,171,533 B1 | * | 1/2001 | Adams et al. | 264/45.2 |

* cited by examiner

Primary Examiner—Allan R. Kuhns
(74) Attorney, Agent, or Firm—Larry L. Huston; Leonard W. Lewis; Steven W. Miller

(57) ABSTRACT

An apparatus and method for molding three-dimensional articles having interstitials. The article has elongate elements and interstitials between the elongate elements. The interstitials may extend entirely through the article, or intercept only the periphery of the article. The article may be formed by injection molding, using two or more mold segments, each having elongate members. The mold segments are separated from each other in a separation direction. The separation direction is parallel to the elongate members of the mold segments and/or the elongate elements of the article. The method and apparatus according to the present invention is useful for making a static mixer, heat exchanger or similar article.

4 Claims, 5 Drawing Sheets

PROCESS OF MAKING INTEGRAL THREE-DIMENSIONAL ARTICLES, AND MOLD FOR MAKING SUCH ARTICLES

FIELD OF INVENTION

The invention relates to three-dimensional moldable articles having interstitials therein, and a process and apparatus for producing such articles.

BACKGROUND OF THE INVENTION

A wide variety of motionless or static mixer designs are known in the art. Static mixers mix one or more fluids, (gases, liquids, powders, etc.) in a flow stream without the need for external energy input such as occurs with rotating impellers, agitation, etc. One of the most effective static mixers comprises a multi-stage labyrinth of elongate mixing elements forming a lattice structure of intersecting webs and slots. Such a static mixer forms a conduit having intersecting channels which transversely split, axially rotate and recombine one or more component fluid streams into smaller and smaller streams. As the component streams become smaller, the outlet product from the static mixer becomes more homogenous.

A static mixer may have multiple stages. A stage combines component streams flowing in a first direction transverse to the axis of the static mixer, then divides the flow in a second direction occurring transverse to the axial flow direction. U.S. Pat. No. 4,062,524, iss. Dec. 13, 1977 to Brauner et al., and U.S. Pat. No. 4,220,416, iss. Sep. 2, 1980 to Brauner et al., disclose exemplary static mixers.

While the lattice type of static mixer has been generally preferred in the industry, it is difficult to construct. Typically, an assembly of individual bars forming a single stage is sand cast. This process is expensive, as each stage is individually cast and a new mold is required to cast each stage. Additional expense occurs when the stages must be joined, in sequence, in the axial direction as disclosed in U.S. Pat. No. 5,435,061, iss. Jul. 25, 1995 to Lantz. Thus, producing a preferred type of static mixer is a time consuming and expensive process.

Alternatively, static mixers have been made from stamped steel plates. The plates have wing portions extending from bending lines and are alternately bent in staggered relationship. The parts thus formed are then assembled into three-dimensional grids having central strip portions and wing portions which provide fluid passages. Static mixers made according to such processes are illustrated in U.S. Pat. Nos. 5,378,063, iss. Jan. 3, 1995 to Tsukada and 5,522,661, iss. Jun. 4, 1996 to Tsukada.

Attempts have been made in the art to injection mold static mixers. However, the injection molded static mixers suffered from simpler designs which do not combine multiple fluid streams as effectively as a lattice type static mixer. One such static mixer is disclosed as an extrusion in U.S. Pat. No. 5,891,487, iss. Apr. 6, 1999 to Parise.

The art relating to injection molding does not disclose a way to make three-dimensional articles comprised of elongate elements, such as static mixer blades, and having interstitials therethrough. For example, U.S. Pat. No. 4,218,038, iss. Aug. 19, 1980 to Garneau, Sr. discloses a mold for making hair combs. However, such a comb is generally planar. Garneau, Sr. does not suggest a way to mold non-planar articles.

Accordingly, there is a need in the art for a way to injection mold three-dimensional articles comprised of elongate elements and having interstitials therethrough. Further, there is a need in the art for a way to inexpensively produce static mixers, heat exchangers, and other articles having elongate elements and interstitials. Finally, there is a need in the art to produce static mixers having more than one stage in a single manufacturing step.

SUMMARY OF THE INVENTION

The invention comprises a process for producing three-dimensional articles having interstitials therein. The process comprises the steps of providing at least two complementary mold segments. The mold segments are juxtaposable to circumscribe an enclosed cavity. The cavity has an axial direction and radial direction perpendicular thereto. Each mold segment has a plurality of members extending into the cavity, and defining an angle relative to said axial direction. The members are juxtaposed to enclose a cavity therebetween. A flowable solidifiable material is disposed in the cavity. The material is allowed to solidify. Each said mold segment is separated from the solidified material, in a direction parallel to the members of that mold segment.

All documents cited are, in relevant part, incorporated herein by reference. The citation of any document is not to be construed as an admission that it is prior art with respect to the present invention.

BRIEF DESCRIPTION OF THE DRAWINGS

The drawings are described in terms of an article useble as a static mixer.

DETAILED DESCRIPTION OF THE INVENTION

The article according to the present invention has many uses, which are not limited to the specific applications described below. However, the article will be described with exemplary, non-limiting uses in mind. It is only necessary that the article be moldable in an integral form. By moldable it is meant that the article is able to be formed from flowable, solidifiable materials. By integral it is meant that the article is molded as a single piece. It is to be recognized that several integral articles according to the present invention may be joined together to form a composite article. However, such joining of integral articles does not change or destroy their integral characteristics, as each integral article remains integral after joining.

Figure 1:
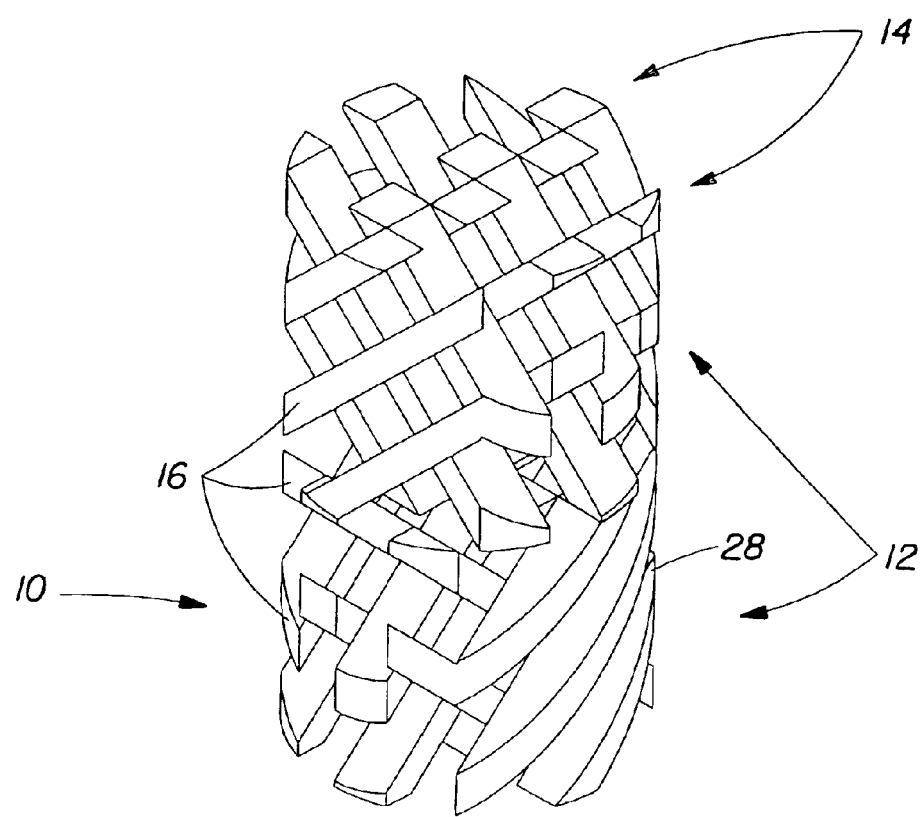
FIG. 1 is a perspective view of a two-stage static mixer.

Referring to FIG. 1, a static mixer 10 according to the present invention will impart shear along its length in the axial direction AD. As used herein, a "static mixer" 10 is an assembly of one or more stages 12 that divides, mixes and recombines materials flowing through a flow channel by subdividing and recombining the flow. A stage 12 is an assembly of elements 14 inserted in the flow channel. An element 14 is an assembly of bars 16, each bar dividing the flow into at least two streams that are combined with other streams and mixed together. Each element 14 forms a plane as described below.

The bars 16 within each element 14 are discrete, optionally parallel, and have a fixed and predetermined geometry. Inside the static mixer 10, fluids flow past the stationary bars 16. The bars 16 are separated by interstitials Thus, any cross-section of the static mixer 10 will comprise alternatingly disposed interstitials and bars 16. Inside the static mixer 10, fluids flow through the interstitials and past the stationary bars 16.

The axial flow direction AD is the primary direction of fluid flow through the static mixer 10. It is to be recognized, however, that very little of the fluid flow is purely in the axial direction AD and that some fluid flow lateral to the axial direction AD is almost always present. The fluid flow in the lateral direction will change as different stages 12 of the static mixer 10 are encountered, and will be different at different positions within the same stage 12 of a static mixer 10. A plurality of lateral directions extends radially outwardly from the axial direction AD.

The static mixer 10 illustrated in FIG. 1 is a two-stage 12 static mixer 10, although a single-stage 12 static mixer 10 is also within the scope of the present invention. Further, it is to be recognized that single-stage 12 or dual-stage 12 static mixers 10 according to the present invention may be combined in sequence, to produce a static mixer 10 having any desired number of stages 12. While a round static mixer 10 is illustrated, the static mixer 10 according to the present invention may be of any desired cross-section. The static mixer 10 may be designed according to the teachings set forth in commonly assigned U.S. application Ser. No. 09/911,774, filed Jul. 24, 2001, in the names of Catalfamo et al. The stages 12 of the static mixer 10 may be of the same or different length in the axial direction AD, of equal or unequal diameter/cross-section, and have the same number of bars 16 or a different number of bars 16.

The bars 16 of each stage 12 of the static mixer 10 form an angle A relative to the axial direction AD. Further, it is typical that a particular stage 12 of the static mixer 10 have at least two sets 18 of bars 16, with each set 18 of bars 16 forming an angle A relative to the axial direction AD. The angle A is illustrated to be 45 degrees in the figures, although the invention is not so limited. Further, an included angle B is acutely formed between interlaced sets 18 of bars 16 within a stage 12 of the static mixer 10. The included angle B is shown to be 90 degrees, but the invention is not so limited. The included angle B may range from 1 to 179 degrees, is preferably 60 to 120 degrees and more preferably is 90 degrees. If each set 18 of bars 16 in a stage 12 of the static mixer 10 forms an equal angle A relative to the axial direction AD, then the included angle B between interlaced sets 18 of bars 16 will be twice the angle A of one set 18 of bars 16 relative to the axial direction AD.

Further, each stage 12 of the static mixer 10 may optionally be rotatably offset about the axial direction AD relative to an adjacent stage 12 of the static mixer 10. The figure illustrates the two stages 12 of the static mixer 10 to be rotationally offset 90 degrees, however, the invention is not so limited.

If a constant rotational offset between adjacent stages 12 is selected, and the static mixer 10 comprises several stages 12, a uniform repeating pattern is formed. Each of the odd stages 12 will have the same rotational orientation relative to the axial direction AD, and each of the even stages 12 will have the same orientation relative to the axial direction AD. One of skill will recognize that such a pattern may be formed at rotational offsets other than 90 degrees as well. Further, it is not necessary that equivalent rotational offsets be used between adjacent or successive stages 12. Any arrangement which divides, stretches and recombines the fluid flow may be suitable.

Figure 2:
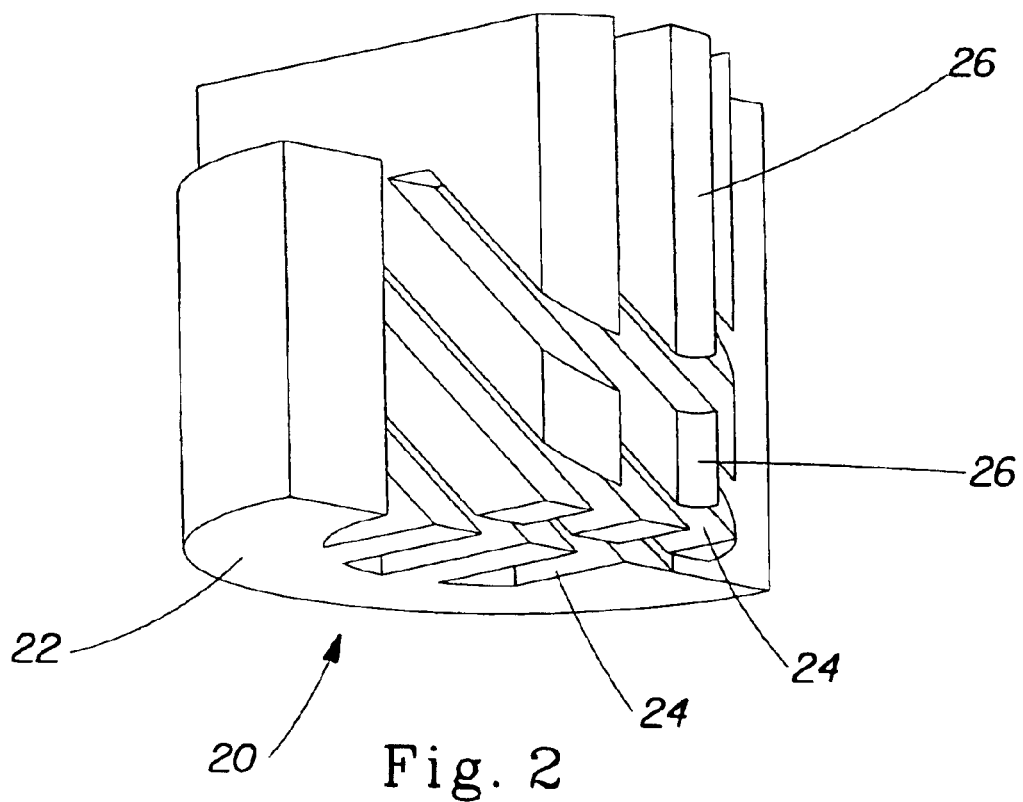
FIG. 2 is a perspective view of one of the mold segments used to produce the static mixer of FIG. 1.

Referring to FIG. 2, an exemplary mold segment 20 is illustrated. Two or more mold segments 20 are circumferentially combined to produce a single stage 12 of the static mixer 10 according to the present invention. If two mold segments 20 are utilized, each mold segment 20 should subtend approximately 180 degrees. If three mold segments 20 are utilized for a particular stage 12, preferably each mold segment 20 subtends 120 degrees. If four mold segments 20 are utilized for a particular stage 12, preferably each mold segment 20 subtends 90 degrees, etc. However, it is to be recognized that mold segments 20 utilized for a particular stage 12 and which subtend unequal arcs may be suitable for the present invention, provided, however, that no mold segment 20 subtends more than 180 degrees.

The mold segments 20 each have alternating blades 26 and slots 24. The blades 26 form the interstitials, or flow channels, in the static mixer 10. Conversely, the slots 24 form the bars 16 of the static mixer 10. The blades 26 and slots 24 are preferably parallel, although the blade 26 may taper from its proximal end to its distal end and become smaller in cross-section as the distal end of the blade 26 is approached. While the figures illustrate blades 26 and slots 24 having a substantially rectangular cross-section, the invention is not so limited. Additionally, either the blades 26 or the slots 24 may have a substantially greater cross-section than the other. Furthermore, different sizes and cross-sections of blades 26 and slots 24 may be utilized within a given mold segment 20 and be disposed in a common stage 12 or in different stages 12. It is only necessary that each mold segment 20 mate with a complementary mold segment 20 as illustrated in FIG. 3.

Figure 3:
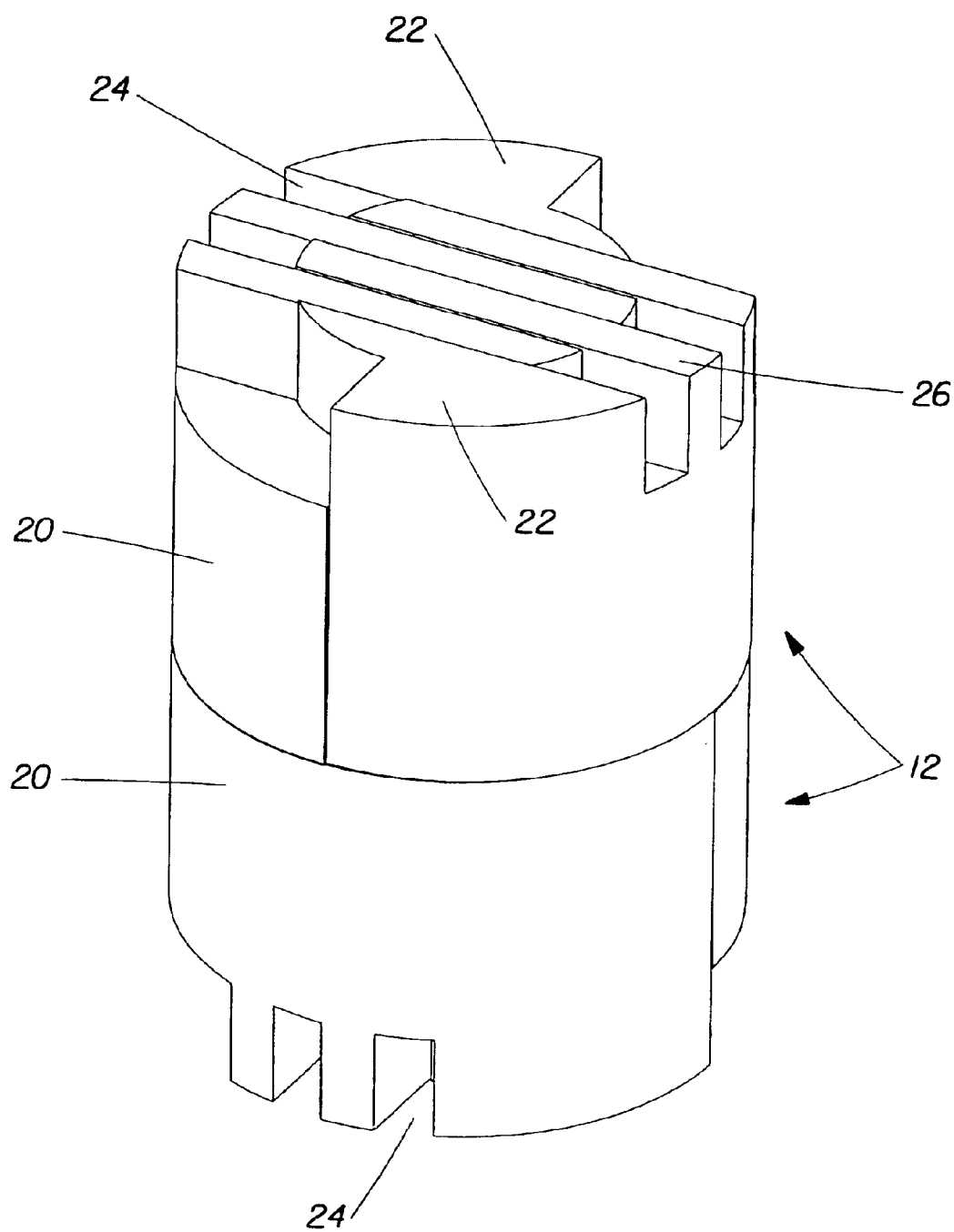
FIG. 3 is a perspective view of the four mold segments used to mold the static mixer of FIG. 1 and shown in the closed position.

Referring to FIG. 3, four mold segments 20 are illustrated in the closed position. The mold segments 20 are considered closed when, for a particular stage 12, they circumscribe that stage 12. It is evident from FIG. 3 that the parting lines of complementary mold segments 20 are offset by 90 degrees. If desired, the parting lines of sequential mold segments 20 may be coincident or oriented at any rotational angle between 0 degrees (coincidence) and 90 degrees. As used herein, an angle between and including 0 and 90 degrees is considered to be acute. Of course, the rotational angle between the parting lines will determine the rotational angle between adjacent stages 12.

Of course, the mold segments 20 will have an inlet port when the mold segments 20 are in the closed position. The inlet port may be located on an axial face 22 of the mold segment 20, or on a circumferential surface of the mold segment 20. Additionally, one or more vents may be incorporated into the mold segments 20 as well and as would be known to one of ordinary skill.

When the mold segments 20 are closed, a flowable, solidifiable material is injected into the cavity created by the mold segments 20. The material may be a gas, liquid, or may be granular as occurs with powder metallurgy. Solidification may occur due to release of thermal energy, such as freezing, reactive phase changes, such as curing and/or compaction such as occurs with granular or powder materials. Suitable materials for use in making the articles described and claimed herein, particularly static mixers 10, include polymers, such as polyolefins and rubbers, metals such as aluminum and steel, and ceramics such as glass. The resulting soldified material may be rigid or flexible when the static mixer 10 is complete.

The flowable, solidifiable material is injected into the cavity formed by and enclosed by the mold segments 20. The material is allowed to solidify. If desired, energy may be applied to assist in causing this material to solidify. For example, thermal energy may be used to freeze the material from a liquid to a solid. However, other forms of energy input include ultrasonic energy, and actinic radiation including ultaviolet radiation. If desired, the static mixer 10 may be produced by rotomolding or may be molded using other forms of centrifugal energy.

Figure 4:
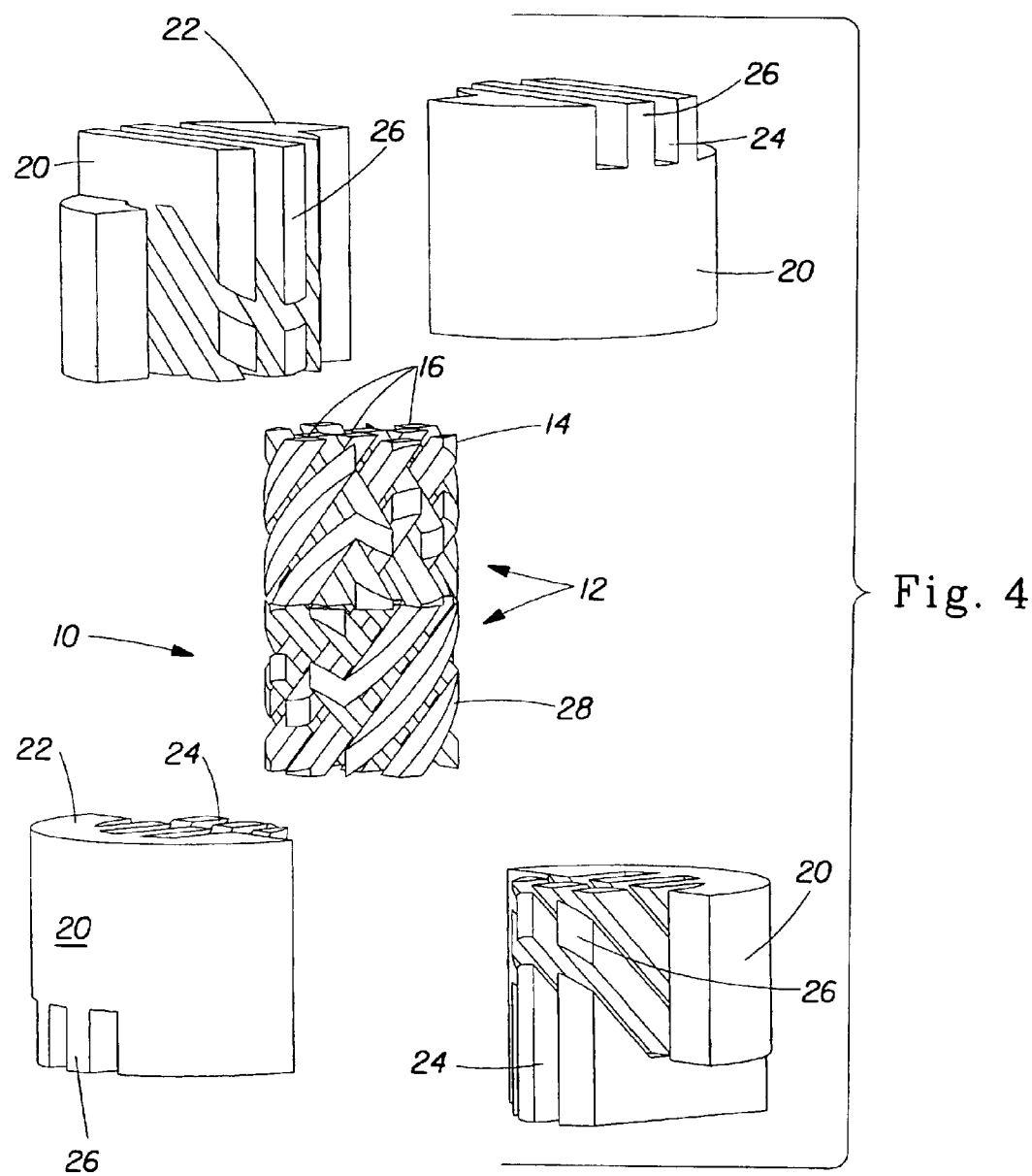
FIGS. 4–5 are perspective views of the static mixer of FIG. 1 and the four mold segments, the mold segments being shown in the open position.
Figure 5:
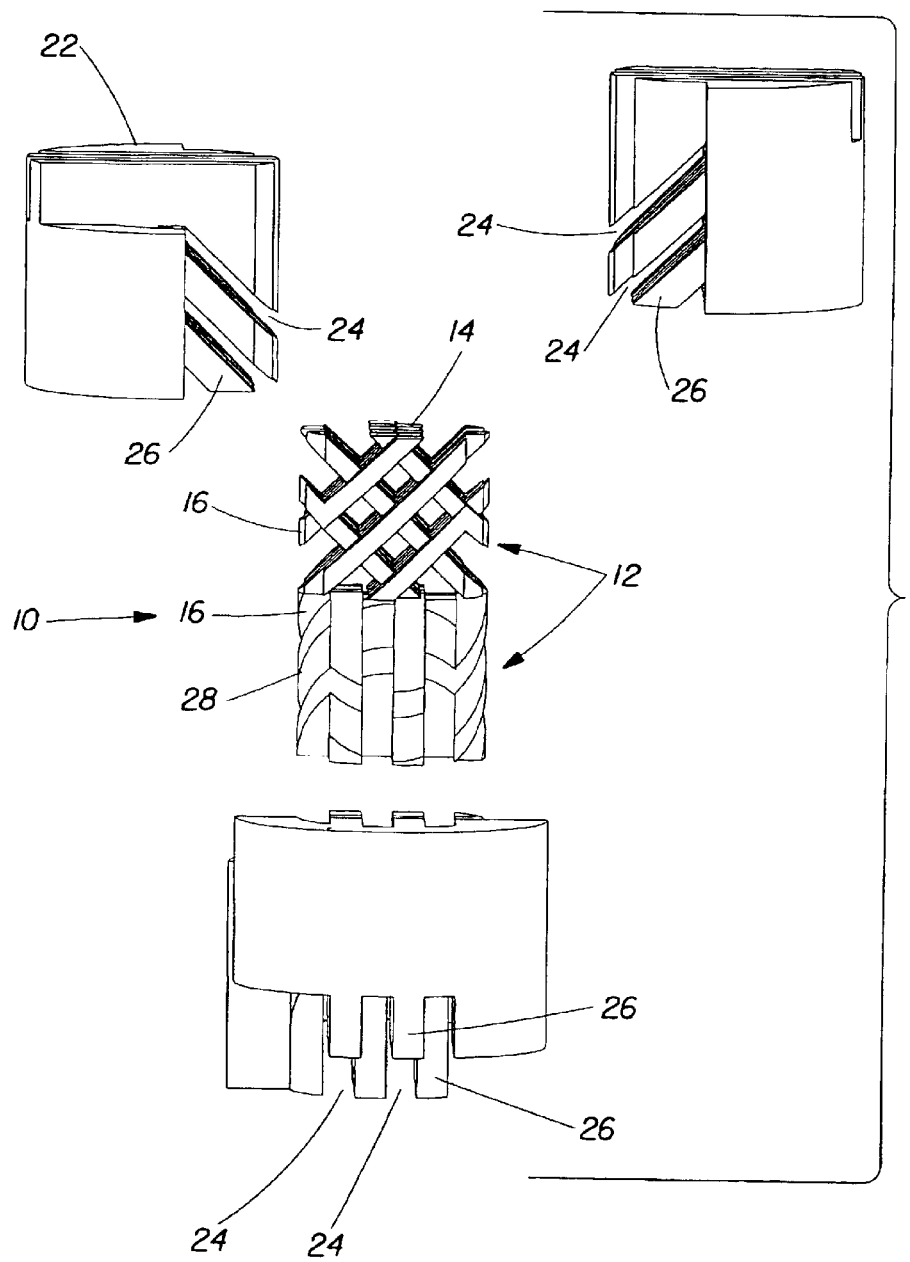

Referring to FIGS. 4–5, each mold segment 20 is separated from the solidified material. The separation of each mold segment 20 occurs in a separation direction SD parallel to the bars 16 of that stage 12 of the static mixer 10. It is to be understood that separation of a mold segment from the solidified material includes any relative separation between the two components. For example, the static mixer 10 formed from the solidified material may be held stationery and the mold segment 20 moved away or vice-versa. One of skill will recognize that removal of the last mold segment 20 may require ejection pins or other means well know to one of ordinary skill.

If desired, sequential removal of the mold segments 20 may occur. By sequential removal, it is meant that mold segments 20 are not simultaneously removed from the static mixer 10 upon solidification. Instead, each mold segment 20 is removed in turn.

Thus, an apparatus according to the present invention may be thought of as having at least two complementary mold segments 20 if a single-stage 12 static mixer 10 is being formed and at least four complementary mold segments 20 arranged in two pairs if a two-stage 12 static mixer 10 is being formed. Upon separation, each mold segment 20 is transported away from the cavity formed when the mold segments 20 are closed. The separation occurs in a separation direction SD which is outwardly from the axis of the static mixer 10, radially outward from the complementary mold segment 20, and axially away from the mold segments 20 of the adjacent stage 12 (if any). Separation may be effected by a transport as is well known in the art. The apparatus may utilize a single transport for one or more mold segments 20. Alternatively, each mold segment 20 may have a dedicated transport.

While the foregoing description has been directed to an article molded by the apparatus and process of the present invention and intended for use as a static mixer 10, the invention is not so limited. The apparatus and process of the present invention may be used to make any three-dimensional article having interstitials therein. By three-dimensional, it is meant that the article may have a significant size in any of three perpendicular dimensions. A three-dimensional article produced according to the present invention will comprise elongate elements 14, such as but not limited to the bars 16 of the static mixer 10. Further, the article made according to the present invention will comprise interstitials. The interstitials are formed by elongate members protruding from the wall of the mold segment 20. The members of a mold segment 20 may protrude from a proximal end juxtaposed with the wall of that mold segment 20 to a distal end remote from the proximal end.

When the mold segments 20 are closed, the distal end of a member may be juxtaposed with a complementary mold segment 20, and more particularly may be juxtaposed with the wall of a complementary mold segment 20. If desired, the distal end of a member may even contact a diametrically opposed mold segment 20. If the distal end of a member contacts a diametrically opposed mold segment 20, the article formed by such an apparatus will have an interstitial therethrough. Diametrically opposed mold segments 20 include the wall of a mold segment 20 lying on a diameter opposite the first mold segment 20, its wall, or extending member, as well as includes mold segments 20 lying across a chord from the original mold segment 20. However, it is not necessary according to the present invention that the article have an interstitial which extends entirely therethrough. Instead, the article may have an interstitial contained therein, recognizing that the interstitial will intercept the periphery 28 of the article.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for molding three-dimensional articles having interstitials therein, said apparatus comprising:

at least three complementary mold segments, said mold segments being juxtaposable to enclose a cavity therebetween, said cavity having a longitudinal axis, said mold segments further comprising a plurality of members extending into said cavity at an angle relative to said axis; and, a transport for separating each said mold segment away from said cavity in a separation direction, said separation direction being parallel to said members of said respective mold segment.

2. An apparatus according to claim 1, comprising at least four mold segments, a first pair of complementary mold segments and a second pair of complementary mold segments, said first pair and said second pair of complementary mold segments being axially juxtaposed.

3. An apparatus according to claim 1, wherein said mold segments subtend equal arcs about said longitudinal axis.

4. An apparatus according to claim 1, wherein said mold segments subtend unequal arcs about said longitudinal axis.

* * * * *

UNITED STATES PATENT AND TRADEMARK OFFICE
CERTIFICATE OF CORRECTION

PATENT NO. : 6,793,192 B2
DATED : September 21, 2004
INVENTOR(S) : Theodore Jay Verbrugge It is certified that error appears in the above-identified patent and that said Letters Patent is hereby corrected as shown below:

Title page,
Insert Item:
-- [*] Notice: This patent is subject to a terminal disclaimer. --.

Signed and Sealed this

Thirtieth Day of August, 2005

JON W. DUDAS
*Director of the United States Patent and Trademark Office*